Oct. 6, 1970  G. A. FISHER  3,532,916
SYNCHRONOUS ROTATING MACHINES HAVING NON-MAGNETIC
TUBULAR ARMATURES
Filed May 19, 1969  2 Sheets-Sheet 1

LEGEND
▲ — PHASE A WINDING
● — PHASE B WINDING
✱ — PHASE C WINDING

INVENTOR
GENE A. FISHER
BY Herbert Lemeyer

ATTORNEY

United States Patent Office 3,532,916
Patented Oct. 6, 1970

3,532,916
SYNCHRONOUS ROTATING MACHINES HAVING NON-MAGNETIC TUBULAR ARMATURES
Gene A. Fisher, Boulder, Colo., assignor to International Business Machines Corporation, Armonk, N.Y., a corporation of New York
Filed May 19, 1969, Ser. No. 825,574
Int. Cl. H02k 1/22
U.S. Cl. 310—266                              10 Claims

ABSTRACT OF THE DISCLOSURE

A synchronous motor has a rotor-armature of tubular nomagnetic material supporting a plurality of windings with a like plurality of slip-rings. The rotor-armature is disposed between two concentric stator-field members. The outer field member generally has an inner cylindrical shape. In one version, all field poles of the same polarity are on the outside of the tubular armature, whereas the poles of opposite magnetic polarity are inside the armature. Opposing poles face each other for concentrating magnetic flux through the armature windings. In another version, all field poles are outside the armature with a magnetic shunt disposed inside the cylindrical armature. The windings on the armature are of the printed circuit type, being disposed both inside and outside the armature to form undulations along the axis thereof.

BACKGROUND OF THE INVENTION

The present invention relates to rotary electric motors and, particularly, to such electric motors having low-inertia, tubular rotors of the synchronous type.

While a great multitude of small (many fractional horsepower) electric motors are single-phase AC motors, many servo motors requiring a high starting torque are DC motors. Selection of DC motors is particularly dominant for those motors having low inertia rotors. DC motors are somewhat limited in the variation of their rotational speeds. That is, the motor's physical construction substantially determines its rotational velocity. In some applications, it is desired to have a small, such as a fractional horsepower, electric motor that has a wide variation of rotational velocity with relatively simple constructional features.

Some low inertia motors have what is termed a "printed circuit armature-rotor." Such DC motors have been utilized for the bidirectional driving of magnetic tape capstans, for example. In such motors, there have been provided permanent magnet field pieces on the outer circumference of the rotor. Inside the armature, but stationarily associated with the field pieces, is a magnetic shunt for providing a low reluctance path for increasing the magnetic flux density in the area of the armature windings. Also, the magnetic shunt has been replaced by a permanent magnet. In order to obtain maximum starting torque, salient pole pieces have been used with the pole pieces being spaced apart sufficiently such that there is insubstantial flux flowing from adjacent pole pieces on the same side of the armature. This limits the number of poles usable in a given motor. It is desired to have as high a starting torque as possible for maximizing acceleration (e.g., in magnetic tape capstan drives). Therefore, it is essential that maximum flux density be provided through the armature windings.

Many synchronous motors require a separate starting winding. Such a starting winding is required because of the low torque characteristics of the synchronous motor at low speeds. Many synchronous motors are not self-starting because the rotating magnetic field caused by the current flowing through the armature windings leads by too great an angle the relationship of the windings to the field pole faces. Therefore, it is desired to have a synchronous motor which has good torque starting characteristics.

SUMMARY OF THE INVENTION

It is an object of the present invention to provide a fractional horsepower, synchronous rotary machine having a low inerita tubular rotor.

It is another object of the present invention to provide a fractional horsepower rotary electrical machine capable of having high flux densities in armature windings with closely spaced-apart field pole faces.

One type of motor using the present invention has a tubular, nonmagnetic armature-rotor with a plurality of printed circuit windings thereon. The armature is disposed in an interstitial space between a cylindrical inner field member securely attached to an outer tubular field member which also provides a low reluctance magnetic path therebetween. The inner cylindrical member has a plurality of salient pole pieces, all of the same magnetic polarity, while the outer tubular field member has a like plurality of salient pole pieces but of the opposite magnetic polarity. The magnetic flux flowing between facing pole pieces is constrained to the small gap therebetween by the magnetic repulsion of the adjacent pole pieces. The armature is rotatable having a plurality of printed circuit slip-rings at one end which are electrically connected to a like plurality of printed circuit windings disposed on the outer and inner circumferential surfaces of the tubular armature. At the axial ends of the armature, the windings are fed through the armature tubular wall to the opposite side thereof.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Figure 1:
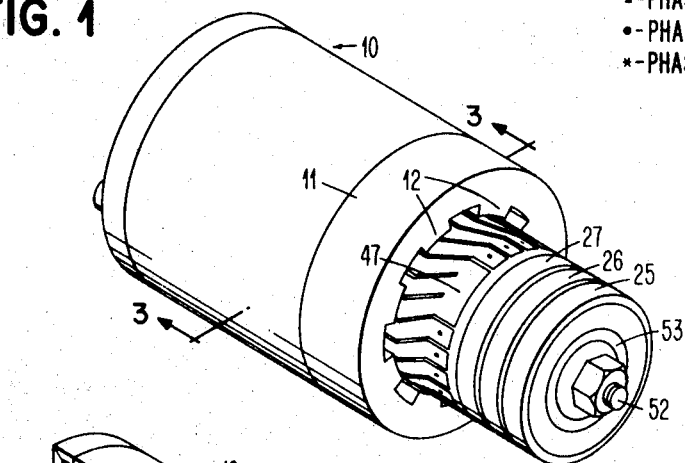
FIG. 1 is a simplified isometric partial view of a motor incorporating the teachings of the present invention.

Referring now to the drawing, like numbers indicate like parts and structural features in the various views.

Figure 2:
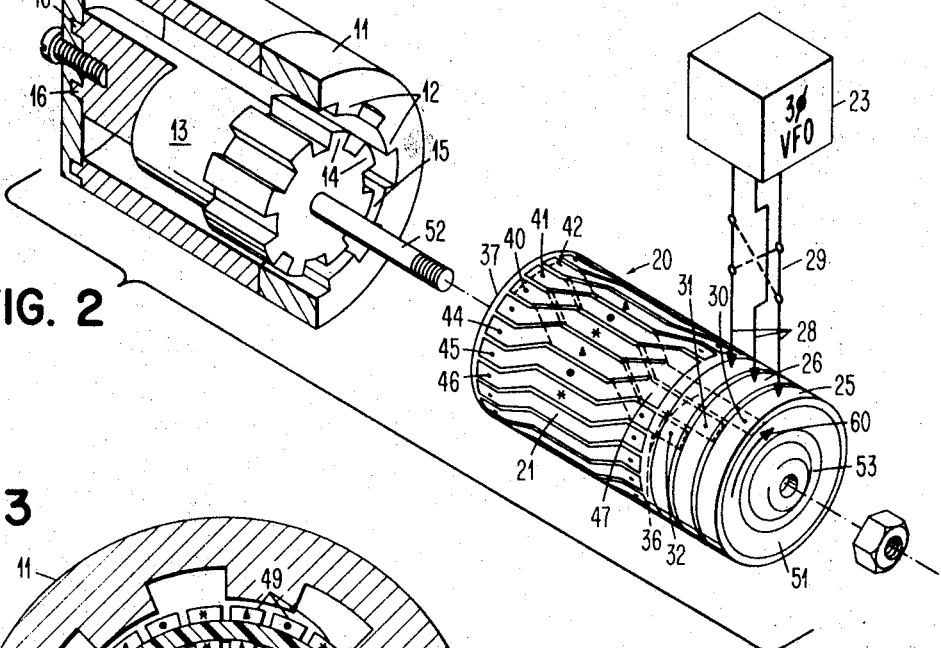
FIG. 2 is an exploded simplified combined diagrammatic and isometric view of a synchronous motor constructed in accordance with teachings of the present invention.
Figure 3:
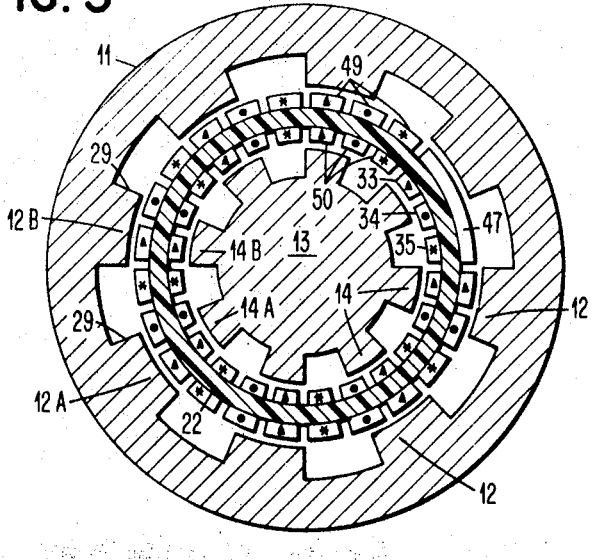
FIG. 3 is an enlarged simplified partially diagrammatic cross-sectional view of the FIG. 1 motor taken in the direction of the arrows along line 3—3, but with the rotor wall enlarged to show its constructional features.

In FIGS. 1, 2, and 3 a first embodiment of the invention is illustrated. Cup-shaped outer stator 10 consisting of magnetically permeable material includes axially extending tubular portion 11. Tubular portion 11 has a plurality of integrally-formed radially-inwardly facing salient pole pieces 12 all having the same magnetic polarity. Stationarily affixed to the bottom wall of cup-shaped outer stator 10 is cylindrical inner stator 13 having a large plurality of radially-outwardly facing pole pieces 14 disposed respectively opposite the radially-inwardly facing pole pieces 12. Inner stator 13 is affixed to the bottom wall of outer stator 10 as by a bolt with accurate locating pins 16. In any event, the mounting of inner stator 13 must be quite secure to the bottom wall of cup-shaped outer stator 10 to ensure that the magnetic attraction between the pole pieces 12 and 14 does not move the inner and outer stators together. When properly positioned, there is an annular space 15 between inner stator 13 and outer stator 10 for movably receiving tubular non-magnetic printed circuit rotor 20. As shown, the inner and outer stators 13 and 10 comprise the field portion of the motor while rotor 20 comprises the armature portion.

Armature 20 is often referred to as a cup-shaped armature. It includes tubular portion 21 carrying windings and movably disposed in annular space 15. The tubular portion consists of a tubular insulating substrate 22, preferably fabricated of a fiberglass material. Disposed thereon are three printed circuit windings respectively for carrying phases A, B, and C from three-phase variable frequency oscillator 23. For convenience, the winding carrying the phase A is identified by a solid triangle, phase B winding by a solid circle, and the phase C winding by a six-line asterisk. Three slip rings 25, 26, and 27 are also formed on annular substrate 22 as best seen in FIGS. 1 and 2. The three slip rings are connected to VFO 23 through a set of three brushes 28 and thence through reversing switch 29 which is used to reverse the direction of rotation of rotor 20.

Returning to the armature, the three slip rings 25, 26, and 27 each are connected by a feedthrough electrical connection 30, 31, and 32 (such as a plated through hole, rivet, or pin) to the inner circumferential surface of rotor 20. Therein, electrical connections are made to the free ends of the three phase windings, identified by numerals 33, 34, and 35 in FIG. 3. Each of the three windings extends axially, as indicated by the three sets of dotted lines 36, to the opposite or open end of open end 37 of cup-shaped rotor 20. The three phase windings are angled or pitched along the circumference. The pitch of the windings along the axis is such that the circumferential displacement for all phases is equal to the spacing between the same relative locations on two like polarity poles (i.e., between the same relative edges 29 of adjacent poles 12a and 12b in FIG. 3). Then, at open end 37, the phase A, B, and C windings are respectively fed through to the outer circumferential surface as at 40, 41, and 42. The three windings are then returned toward the slip ring end of the rotor. At that end, they are again fed through to the inner circumferential surface and returned to the open end 37. This arrangement continues counter-clockwise (FIG. 2) completely around the circumference of the rotor until the three windings reach the outer circumference at 44, 45, and 46, the outer circumferential surface immediately adjacent to the first-mentioned feedthroughs at 40, 41, and 42. The windings then proceeded axially toward the slip ring end and are terminated in a Y-connection by the metallized area 47. It is seen that the armature has Y-connected windings. It is to be understood that, by the addition of other slip rings, delta connected windings can be used or that the Y-connection at 47 can be brought out to external circuits, as may be desired. While the windings have been shown as being exposed on the inner and outer circumferential surfaces of the tubular armature, no limitation thereto is intended. A coating can be applied over the windings, a multilayered printed or etched circuit arrangement can be provided or the windings may be imbedded in the insulative material. All these arrangements plus other variations or extensions thereof are intended to be included as having windings on the inner and outer circumferential surfaces of tubular substrate 22.

Referring next to FIG. 3, the armature or rotor 20 winding configuration is seen in axial cross-sectional view. The first winding portions 33, 34, and 35 extending on the inner circumferential surface immediately adjacent the slip rings and the relationship thereto of the metallized area 47 forming the Y-connection is best seen. The three windings are first returned on the outer circumference toward the slip ring end as at 49 and thence on the inner circumferential surface as at 50.

Rotor 20 also includes axial end wall 51 rotatably secured to an axially outwardly extending shaft 52 of inner stator 13 by bearing 53. Rotor 20 is cantilevered for rotation by bearing 53 into the annular space 15.

With brushes 28 connected to VFO 23, as shown for the solid lines in reversing switch 29, the motor rotates in the direction of the arrow 60. However, by throwing reversing or four-way switch 29 such that the electrical connections are indicated by the dotted lines therein, the direction of rotation of rotor 20 is reversed in accordance with well understood principles.

The facing pole pieces 12 and 14 respectively have relatively small gaps therebetween. In FIG. 3, this gap is greatly enlarged to show the cross-sectional constructional features of rotor 20. This short gap means there is a capability of providing a high flux density through the armature windings. The magnetic flux between facing pole pieces 12 and 14 has a tendency to be constrained to the illustrated gaps by the opposing fields of the adjacent pole pieces. For example, pole piece 12a can be assumed to be a north pole. Pole piece 12b in a like manner is also a north pole. Magnetic flux leaving pole pieces 12a and 12b respectively towards the inner stator pole pieces 14a and 14b see the least reluctance between the facing pole pieces. Adjacent pole pieces will not "steal" the flux flowing therebetween because of the magnetic repulsion of like poles. Such action permits closely spaced-apart poles since the flux flowing between facing pole pieces is constrained to ramain in the gap formed. This action also maximizes the flux density of the fields flowing through the armature windings. This combination therefore enables the motor construction illustrated in FIGS. 1, 2, and 3 to have a maximum torque for the size of motor and for a given armature current amplitude. For small motor construction, it is also apparent that a relatively simple construction is provided to enable high torque capabilities.

There is no starting winding provided for the FIGS. 1, 2, and 3 illustrated motor. The motor can be made to be self-starting in that the VFO 23 is programmed to first supply a relatively low frequency signal, for example, five to ten Hz. As the rotor 20 begins to rotate in synchronism with the applied low frequency power, the applied power frequency is increased until rotor 20 is rotating at the desired rotational velocity. A problem encountered in starting synchronous rotating machines is that the rotating magnetic field caused by the three phase current in the armature windings travels faster around the armature than the rotor can accelerate. Therefore, there is infinite slip between the rotating magnetic field and the rotor to effectively provide no torque. This is overcome by starting the motor at relatively low frequencies which enables the low inertia rotor 20 to follow a relatively slow rotating magnetic field.

While a three phase synchronous motor is shown, the principle of the present invention can be applied to two phase or other multiphase synchronous motors. The principles involved in maximizing flux density between facing salient pole pieces by making all poles on the outer circumference of the tubular rotor 20 of the same polarity and providing the opposite magnetic polarity pole pieces on inside the rotor can be applied to DC or single phase AC motors with equal facility.

Figure 4:
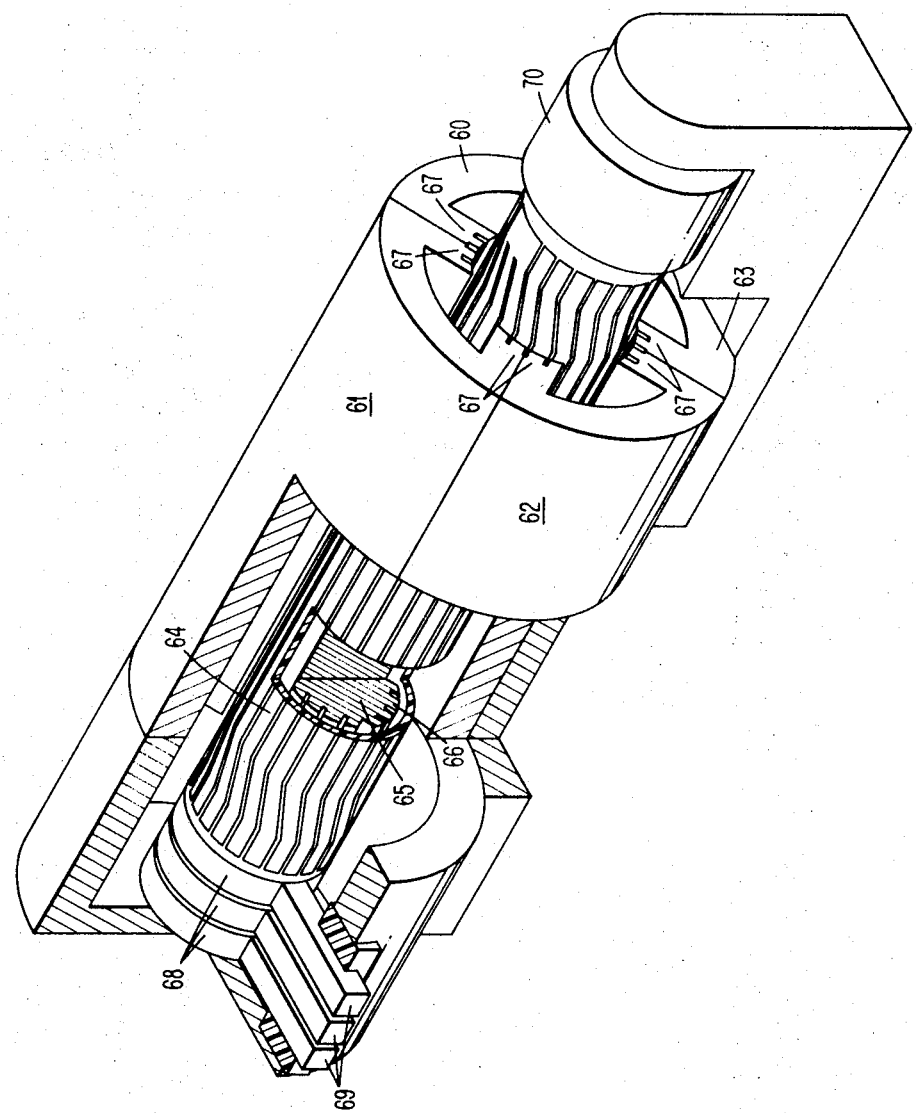
FIG. 4 is a partial simplified isometric view of a synchronous motor having horseshoe type field magnets about a tubular armature and utilizing the teachings of the present invention.

Referring next to FIG. 4, a second embodiment of the invention is illustrated. The outer stator consists of four C-shaped permanent magnets 60, 61, 62, and 63. Concentrically disposed inside the circumferentially spaced-apart pole faces of the stator pole pieces 67 is tubular armature 64 having phase A, phase B, and phase C windings thereon constructed in the same manner as explained in detail for rotor 20 illustrated in FIG. 1. Stationarily mounted with respect to the outer stator, but inside tubular armature 64, is low reluctance magnetic shunt member 65 having a plurality of radially outwardly facing salient pole pieces 66 arranged to be closely spaced from the permanent magnet outer stator pole pieces 67. The combination of the outer stator permanent magnets 60–63 constitute an outer tubular field member. The sole purpose of the inner stator is to provide a low reluctance return path for the magnetic flux from the permanent magnets. This serves to concentrate or increase of flux density flowing between opposite polarity outer stator pole pieces 67. Alternatively, magnetic shunt 65 can be a permanent magnet with north and south poles spaced circumferentially around the inner circumference of tubular armature 64.

Tubular rotor-armature 64 has three slip rings 68 formed thereon as explained for rotor 20. Three brushes 69 make electrical connections to a variable frequency three phase source (not shown). It is apparent from inspection of FIG. 4 that the rotational velocity is a function of the frequency applied to the armature 64 windings as divided by the number of pole pieces 67 on the outer stator. Again, to start the synchronous motor illustrated in part in FIG. 3, the applied power frequency to armature 64 is initially very low to enable the armature to rotate synchronously with the rotating magnetic field generated by the current in the three phase windings. As torque is developed, the speed of rotor is increased by increasing the frequency of the applied power until a desired rotational velocity is attained. Direction of rotation is reversible as explained with respect to FIG. 2.

In FIG. 4, driving member 70 is shown as being an extension of tubular armature 64. It may be formed as an integral part thereof (i.e., extension 70 may be a part of substrate 22). Portion 70 may have a suitable friction material thereon for driving a magnetic tape web. A vacuum system (not shown) also may be attached thereto for engaging the tape in the driving manner. Rotor 20 of the FIG. 1 illustrated embodiment may be constructed in a similar manner.

While the invention has been particularly shown and described with reference to preferred embodiments thereof, it will be understood by those skilled in the art that various changes in form and details may be made therein without departing from the spirit and scope of the invention.

What is claimed is:

1. An AC synchronously powered rotary electric machine, the improvement including the combination:
   a tubular field member of magnetic material having a plurality of inwardly extending pole pieces symmetrically disposed about an axis of said cylindrical field member,
   a tubular nonmagnetic armature disposed inwardly and concentric of said tubular field member with first and second circumferential surfaces and mounted for relative rotation with respect thereto,
   a second field member stationarily associated with said tubular field member and concentrically disposed inside said tubular armature and having said plurality of radially outwardly extending pole pieces with pole faces being disposed opposite said pole faces of said tubular field member,
   means providing a magnetic path of low reluctance between said field members to maximize magnetic flux density between said respective pole pieces,
   said pole pieces in said second field member having a magnetic polarity opposite to the magnetic polarity of the respective opposite pole pieces in said cylindrical field member,
   said tubular armature having a plurality of slip rings disposed on said first circumferential surface and extending continuously therearound,
   electrical conduction means extending radially respectively from said slip rings to said second circumferential surface,
   a like plurality of windings of the printed circuit type on said circumferential surfaces respectively connected to said slip rings and extending generally axially along said tubular armature to the opposite end, and being progresisvely circumferentially disposed about the entirety of said tubular armature, all said windings reaching a point of common return adjacent said slip rings but on said second circumferential surface wherein all of said printed circuit windings are jointed together to form a Y-winding arrangement on said tubular armature, and
   electrical connections to said slip rings.

2. The machine of claim 1, wherein the magnetic polarity of said pole pieces in said tubular field member are all of a first magnetic polarity and all of said pole pieces in said second field member are of a magnetic polarity opposite to said first magnetic polarity.

3. The machine of claim 2, wherein said tubular field member is a cup-shaped magnetic member having an end wall along one axial end, and
   said second field member being stationarily affixed to said wall member, said wall member having a low magnetic reluctance.

4. The machine of claim 3, wherein said tubular nonmagnetic armature further includes an axial end wall adjacent said slip rings with a shaft extending axially outwardly therefrom, and
   bearing means stationarily associated with said tubular field member and rotationally supporting said shaft for catilevering said tubular nonmagnetic armature between said tubular and second field members.

5. The machine of claim 2, further including a multi-phase electrical energy source connected to said electrical connections and having a variable frequency power signal for starting said machine at a low power frequency without a starting winding.

6. The machine of claim 1, wherein said tubular field member consists of a plurality of horseshoe magnets circumferentially disposed about said tubular nonmagnetic armature with alternating north and south poles and said second field member having facing pole pieces for forming a low magnetic reluctance path between north and south pole pieces of the respective horseshoe magnets.

7. The machine of claim 6, wherein said tubular armature has an axial end extension forming a driving portion of said armature with no windings being thereon.

8. The machine of claim 1, wherein said tubular armature has an axial extension with no windings thereon serving as a driving member of said machine.

9. An electric rotary machine, including the combination:
   a tubular rotatable member of nonmagnetic material with winding means mounted thereon and extending the axial length of an activating portion thereof and electrical connections to said winding means,
   outer stator means including field means having a plurality of pole faces of the same magnetic polarity circumferentially disposed about said tubular nonmagnetic armature for cooperative relationships with said winding means, inner stator means including field means having a like plurality of pole faces respectively disposed circumferentially opposite said outer stator means pole faces and having a magnetic polarity opposite to magnetic polarity of all said pole faces in said outer stator means, means magnetically coupling said inner and outer stator field means.

10. The machine of claim 9, wherein said nonmagnetic armature is cup-shaped and has an axial wall with a shaft extending outwardly therefrom, bearing means rotatably supporting said cup-shaped armature and being stationarily associated with said outer stator means.

References Cited

UNITED STATES PATENTS

| 1,782,519 | 11/1930 | Sutton | 310—266 |
| 3,209,187 | 9/1965 | Angele | 310—266 |
| 3,312,846 | 4/1967 | Henry-Baudot | 310—266 |
| 3,329,846 | 7/1967 | Lawrenson | 310—162 |

MILTON O. HIRSHFIELD, Primary Examiner

R. SKUDY, Assistant Examiner

U.S. Cl. X.R.

310—162, 198, 264